(12) United States Patent
Stricklin et al.

(10) Patent No.: US 9,495,688 B2
(45) Date of Patent: Nov. 15, 2016

(54) SYSTEM AND METHOD FOR PREFERENCE GENERATION

(75) Inventors: Greg Stricklin, Del Mar, CA (US); Jim Stricklin, Del Mar, CA (US)

(73) Assignee: FILTEREDSPACE, INC., Del Mar, CA (US)

(*) Notice: Subject to any disclaimer, the term of this patent is extended or adjusted under 35 U.S.C. 154(b) by 0 days.

(21) Appl. No.: 13/420,514

(22) Filed: Mar. 14, 2012

(65) Prior Publication Data

US 2012/0265813 A1 Oct. 18, 2012

Related U.S. Application Data

(60) Provisional application No. 61/452,615, filed on Mar. 14, 2011, provisional application No. 61/507,538, filed on Jul. 13, 2011.

(51) Int. Cl.
G06Q 30/02 (2012.01)
G06Q 20/04 (2012.01)
G06Q 10/02 (2012.01)

(52) U.S. Cl.
CPC .......... G06Q 30/0201 (2013.01); G06Q 10/02 (2013.01); G06Q 20/045 (2013.01); G06Q 30/02 (2013.01)

(58) Field of Classification Search
CPC ............. H04L 63/0876; H04L 63/104; H04L 63/107; H04L 67/18; H04L 67/306
USPC ................ 709/203, 204, 217, 219, 223, 224
See application file for complete search history.

(56) References Cited

U.S. PATENT DOCUMENTS

| | | | |
|---|---|---|---|
| 8,108,414 B2* | 1/2012 | Stackpole | 707/758 |
| 2001/0049653 A1* | 12/2001 | Sheets | 705/38 |
| 2003/0187802 A1* | 10/2003 | Booth | G06Q 10/02 705/59 |
| 2004/0176997 A1* | 9/2004 | Podgurny et al. | 705/14 |
| 2006/0241860 A1* | 10/2006 | Kimchi et al. | 701/208 |
| 2007/0055554 A1* | 3/2007 | Sussman | G06Q 10/02 705/5 |
| 2007/0088603 A1* | 4/2007 | Jouppi et al. | 705/14 |
| 2007/0143185 A1* | 6/2007 | Harmon | G06Q 20/045 705/14.16 |
| 2007/0273558 A1* | 11/2007 | Smith et al. | 340/995.1 |
| 2007/0282621 A1* | 12/2007 | Altman et al. | 705/1 |
| 2008/0162211 A1* | 7/2008 | Addington | G06Q 10/02 705/14.5 |
| 2008/0208844 A1* | 8/2008 | Jenkins | G06F 17/30395 |
| 2009/0112782 A1* | 4/2009 | Cross | G06Q 30/02 706/45 |
| 2010/0113072 A1* | 5/2010 | Gibson | G06Q 20/045 455/466 |
| 2011/0072085 A1* | 3/2011 | Standley | 709/204 |
| 2011/0137818 A1* | 6/2011 | Goad et al. | 705/347 |
| 2011/0182283 A1* | 7/2011 | Van Buren | H04M 3/4936 370/352 |
| 2011/0289142 A1* | 11/2011 | Whalin | G06Q 30/02 709/203 |

* cited by examiner

*Primary Examiner* — Barbara Burgess
(74) *Attorney, Agent, or Firm* — DLA Piper LLP (US)

(57) ABSTRACT

The system provides a method and apparatus for preference generation that allows, for example, geographic boundaries to be easily implemented by a user. The system permits a user and other participants to manually and/or automatically constrain options to specific user and participant defined criteria, including geographic, categorical, economical, temporal, and other preference metrics.

17 Claims, 9 Drawing Sheets

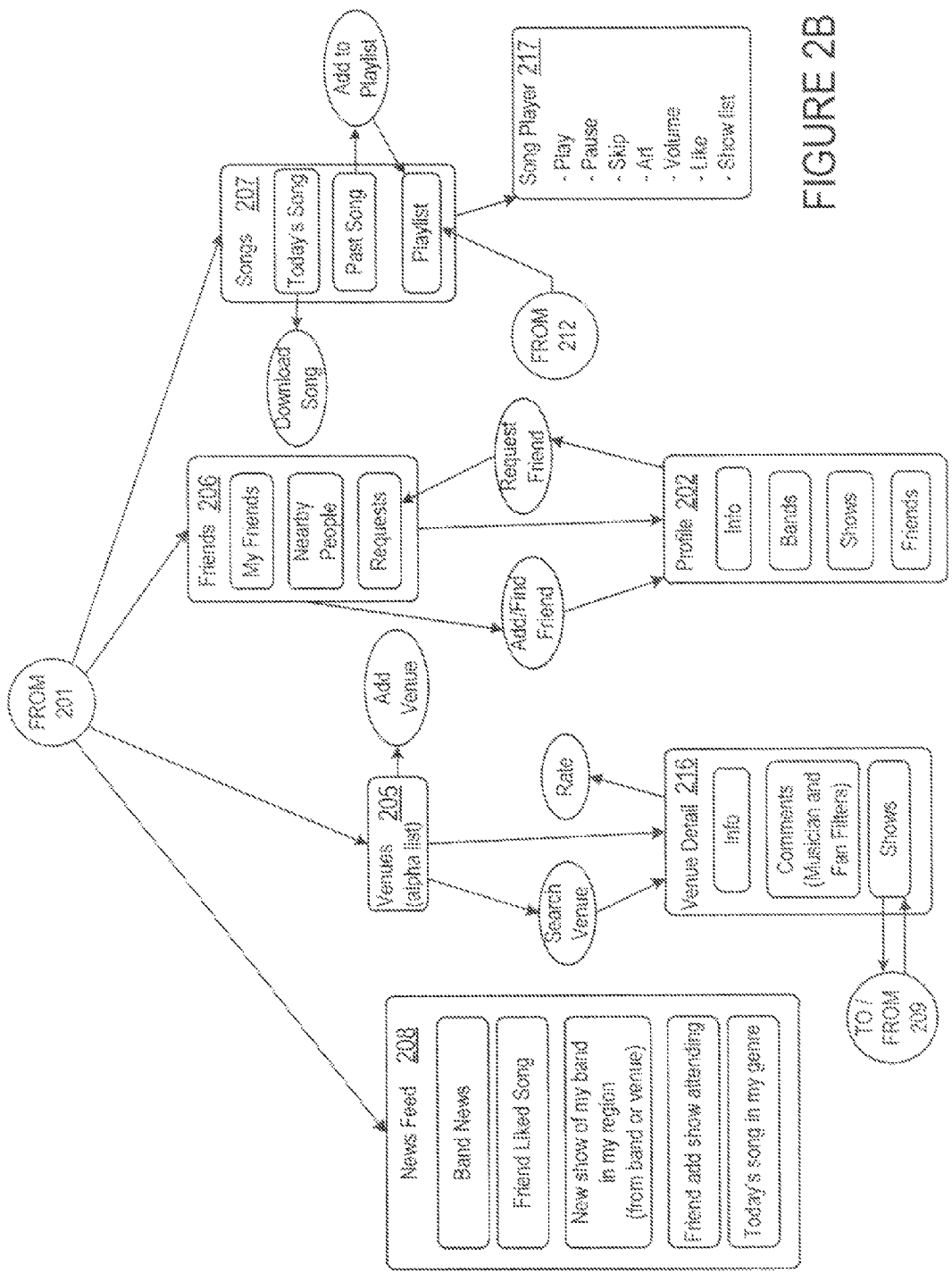

SYSTEM AND METHOD FOR PREFERENCE GENERATION

This patent application claims priority to U.S. Provisional Patent Applications 61/452,615 filed on Mar. 14, 2011 and 61/507,538 filed on Jun. 13, 2011, both of which are incorporated by reference herein in their entirety.

BACKGROUND OF THE SYSTEM

The present system relates to the field of systems and methods for implementing a preference generation and decision making system.

One of the disadvantages of current internet and social media systems is the difficulty in truly constraining interaction based on user preferences. One particular disadvantage of current systems is the lack of true geographic solutions and locality of use. A user searching the internet has limited ability to focus in on a specific geographic area. Even if the user adds geographic search terms to the query, non-responsive results are always provided, limiting the usefulness of the system. There are currently no good ways for a user to define a desired locality and implement effective geographic use.

One industry where this limitation arises, by way of example, is the music industry. The music industry has undergone radical transformation in light of the rise of digital music and the Internet. The prior art business model of major label dominance of music acts, combined with corporate radio networks and sale of physical media to consumers has ended. To date, there have been many attempts to fill the void that has been left behind.

One un-kept promise that has consistently been made in this new era is the ability of musicians to connect directly to their fans so that the absence of the record labels would not impact the musician/fan dynamic. However, the marketing power and expertise of the record labels has not been easily duplicated, except for the richest and most well regarded of musicians with existing and extremely loyal fan bases.

The ability to find new music has been diminished as well. Several factors have combined to lead to this situation. One, the record labels have been receiving extremely high profits on catalogue recordings that users have repurchased on CD and DVD to replace more fragile prior art media. This has caused the record labels to focus on this lucrative area for so long that new music has not been developed and marketed as it would have in previous days. Another factor is consumer unwillingness to pay for unproven talent, choosing instead to pirate digital copies of music except in the rarest of occasions. Finally, as profits have fallen in light of catalog exhaustion and dwindling profits due to digital media distribution, the A&R departments of record companies have been shrunk or underfunded, removing the existing paths for new talent to surface.

Although the internet was initially proposed as a vehicle for new talent to make themselves known, it has not turned out that way. The internet is an international space, and it is difficult to regionalize or localize web content in a manner that would allow a user to focus on music in the user's immediate area, without a large amount of effort on the part of the user.

In addition, there has been no coordination between venue owners, musicians, fans, and other aspects of the music industry to make it easier for music to be discovered.

SUMMARY

The system provides a method and apparatus for preference generation that allows, for example, geographic boundaries to be easily implemented by a user. The system permits a user and other participants to manually and/or automatically constrain options to specific user and participant defined criteria, including geographic, categorical, economical, temporal, and other preference metrics.

The present system is an elective system of users, service providers, and coordinators. The system requires accurate and meaningful preference metrics to be submitted by all participants so that preference generation and decision making can be appropriately bounded and thus made more useful. The system includes the ability of users, service providers, and coordinators to rate each other and to provide useful information to decision makers. The system also allows B2B communications to establish permanent or temporary relationships among participants.

In one embodiment, the system provides separate portals for each type of participant in the system.

BRIEF DESCRIPTION OF THE DRAWINGS

FIGS. 2A and 2B illustrates the flow of a fan interface.

DETAILED DESCRIPTION OF THE SYSTEM

Figure 1:
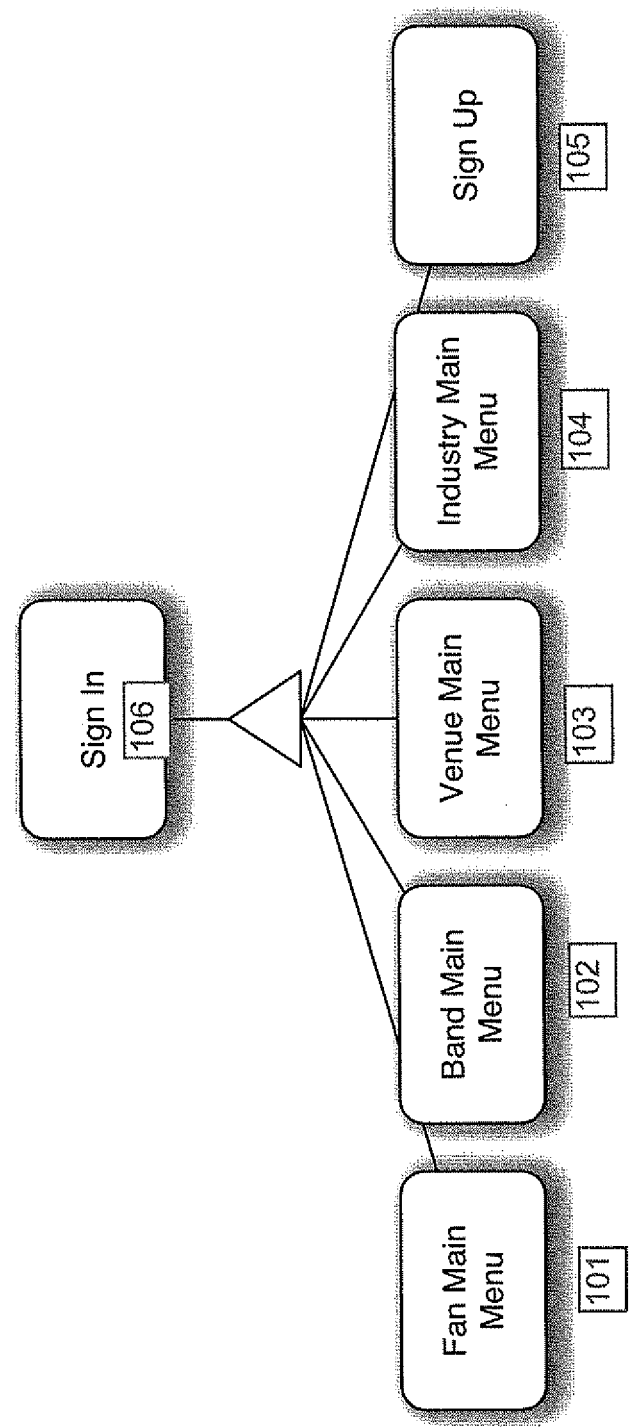
FIG. 1 illustrates an embodiment of the system.

The system provides a community of participants so that meaningful and bounded preferences can be easily implemented in a decision making system. The system can apply to a plurality of environments where preference metrics are important. For example, the system has application to systems with geographical constraints, such as real estate, auto purchase, vendor selection, entertainment selections including music, dance, adult entertainment, plays, comedians, and the like. The system is described in a number of embodiments, but this is for purposes of example only, and other implementations may be used without departing from the scope and spirit of the system.

By way of example, in one embodiment related to music, the users are fans, the service providers are musicians, and the coordinators are venues. In this embodiment, the system allows for coordinating musician, fans, venues, and industry into a single environment that allows the promotion and discovery of performances at a local level. The system presents unique interfaces for fans, musicians, venue owners, and distribution (industry). The system includes a fan based interface as well as a B2B (business to business) interface for professional use.

A fan can use the system to identify live music in, for example, a specific geographical area of the fan. If the fan travels to another region, the system allows the fan to identify the new location and to inform of live music in the area. The fan can set filters that limit search results to certain parameters. For example, the fan can set filters for genre, musician reputation, venue reputation, event cost, distance to venue, and the like. The system allows the fan to rate the musician, the venue, and the like. Ratings from all fans that rate a particular musician or venue are aggregated along with specific comments so that fans can have useful information about musicians and/or venues.

A venue owner can use the system to provide promotional information about their venue, including the upcoming acts, dates, etc. The system allows the venue owner to rate musicians and the crowds that tend to follow a musician. The system also allows venue owners to access the ratings of the musicians that have been made by other venue owners. Such rating information can include timeliness, professionalism, length of set, level of equipment, types of fans, and the like.

A musician can use the system to promote performances anywhere the musicians will perform. The musician can use the system to self-identify particular genres and styles that the musician performs. The system also allows the musician to rate venues and venue owners for cleanliness, performance space, payment problems, honesty, promotion efforts, and the like.

Music industry professionals can also use the system to learn about and sign acts to their labels as desired.

The system includes a feature that allows certain tastemakers, such as college radio stations, to play a role in determining new musicians that can be included in the system community. In one embodiment, the system is restricted to professional musicians to prevent saturation with amateurs. In another embodiment, the system requires participating musicians to make a certain number of audio and/or video tracks available for download, either for free or for a nominal cost. The system also includes a mechanism for distributing songs for sale.

Overview

Figure 5:
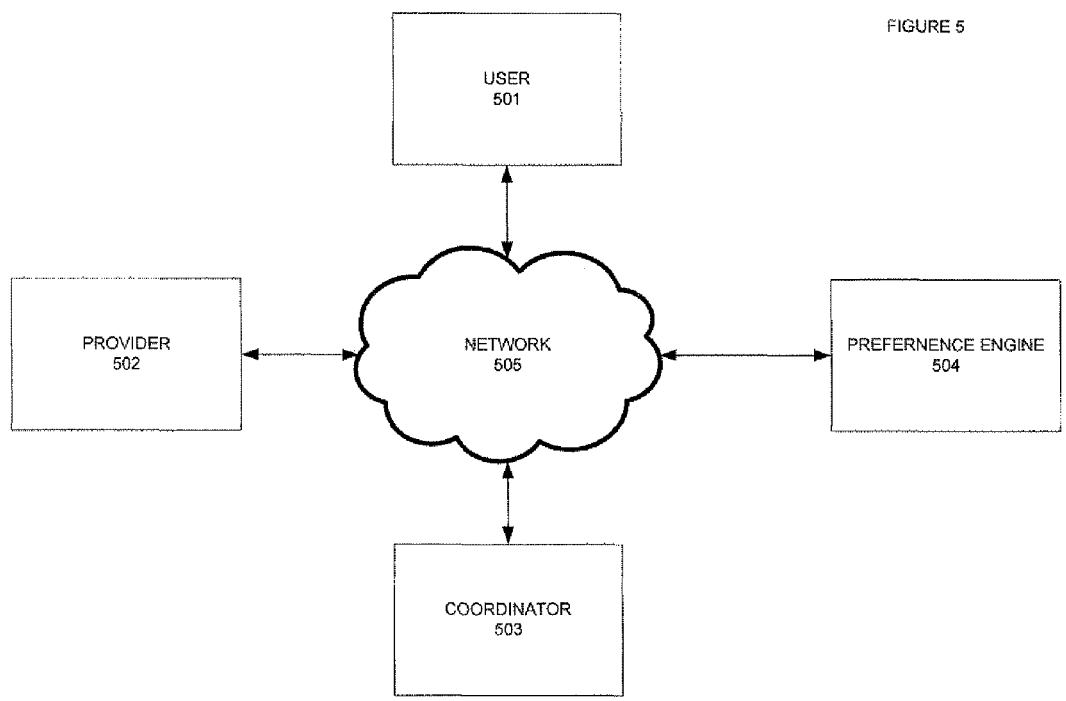
FIG. 5 is a block diagram illustrating an overview of the system.

FIG. 5 is a block diagram of an embodiment of the system. The system comprises a plurality of participants (e.g. a user 501, provider 502, and coordinator 503) interacting via a preference engine 504. The system is a participatory arrangement where each participant creates a user profile in a manner that allows more specific bounding of preferences vis-à-vis other participants so that more meaningful relationships between the participants can be created. These relationships can be social, commercial, or some combination of both. In some cases, the relationships may be temporary.

In one embodiment, the user 501 is an individual who is looking to access services or create a relationship with a provider. The provider 502 is an individual and/or entity who desires to find and engage users for the services provided. The coordinator 503 is an individual or entity that has the ability to bring users 501 and providers 502 together, either at a location provided by the coordinator 503 or at some other location. In addition, it allows coordinators 503 to offer relationships to providers 502 and for providers 502 to offer relationships to coordinators 503. The user 501, Provider 502, and Coordinator 503 communicate with the preference engine through a network 505. In one embodiment, the network is the internet.

The preference engine 504 maintains the profiles of all participants and provides the manner of taking requests, informing of opportunities, and finalizing transactions by and between the participants. The preference engine 504 can provide messaging capability in any platform, including computers, PDA's, cell phones, smart-phones, and the like, via emails, text messages, SMS, and the like.

Figure 6:
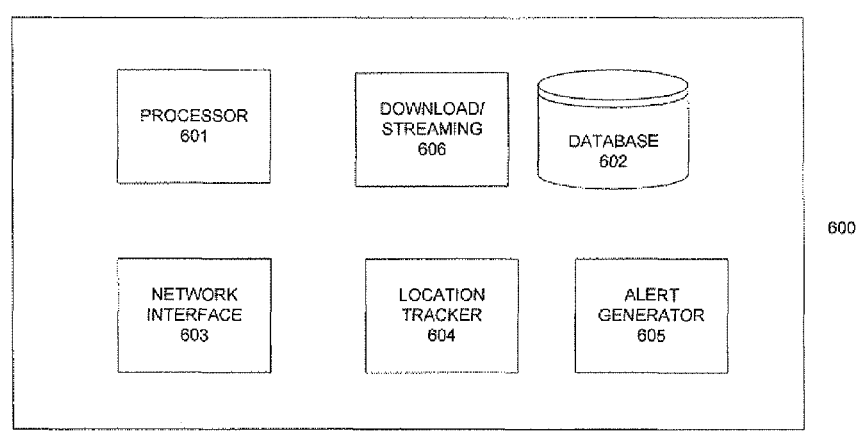
FIG. 6 is a block diagram of an embodiment of the preference engine.

FIG. 6 is a block diagram an embodiment of the preference engine 504 of the system. The preference engine 504 includes a processor 601, database 602, network interface 603, location tracker 604, download/streaming 606, and alert generator 605.

The database 602 stores the profile information of all participants, including users 501, providers 502, and coordinators 503. The participant profiles include metrics and other preference information that is useful for whatever application is being implemented using the preference engine (see for example, the music embodiment below).

The processor 601 is controlled by appropriate software instructions to handle administrative functions and operational activities of the system, the push and pull messaging, and determination of when preferences have been met such that a notification should be generated.

The network interface provides the browser based and smart-phone based interface into the system. The system contemplates a smart-phone app resident on a participant device to facilitate access to the system.

The location tracker 603 allows the system to provide geographic specific information when a participant has enabled tracking. The system can receive location information from a participant, and, based on preferences indicated by the participant, push or pull data accordingly. For example, if a user is near a coordinator or provider, the user may have elected to be notified on a smart-phone that a coordinator or provider is nearby.

The alert generator 605 is used to push information to a participant when certain conditions have been met, based on profiles and preferences of the participants. See, for example, the reward system described in the movie embodiment below.

The download/streaming block 606 is used to provide content to participants, either promotional or commercial, depending on the application. It is contemplated that the system can operate as a store for the sale and distribution of content of whatever type is appropriate depending on the participants.

Music Embodiment

One embodiment of the system is used in the music industry as described below. This is given by way of example only, and other uses of the system are contemplated.

The system is a destination that allows the promotion and identification of performances in geographic regions. The system also provides a distribution mechanism so that musicians (providers 502) can sell music to customers (users 501). The system presents a number of interfaces depending on the use of the system for personal or commercial (e.g. B2B) use. These interfaces and uses include a fan interface, band interface, venue interface (coordinator 503), and industry interface.

An example of an embodiment of the system is illustrated in FIG. 1. A user can enter the system via one of a plurality of interfaces, depending on the type of user. For example, there is a Fan interface 101, a Performer interface 102, a Venue interface 103, an Industry interface 104 and a Sign Up interface 105 for new users of any type. Once the user goes to the appropriate interface page, the user will then sign in to their account at Sign In 106.

The interfaces in one embodiment are smart phone applications so that the user can enjoy the use of the system at all times. The system contemplates that a user may bring a smart phone to a performance and the system can provide additional services and benefits to a user's smart phone while at a performance. In addition to the smart phone environment, the system contemplates that the interfaces may be accessed via browser from any appropriate device, including laptops, desktops, tablet computers, and the like, Fan Interface The system allows fans to easily locate, preview, book, and review performances of musicians in the fans geographical area. (Note, when we refer to musicians herein, we are speaking of both solo acts and bands). In the current art, when a fan wants to determine what music is available in their geographic region, all options for doing so are compromises. Newspapers, alt-weeklies, radio, and advertising all have deficiencies in that either the geographic region covered is too large, the information is incomplete or inaccurate, or not all musicians or venues are included. Likewise, searching for performances on the internet requires that the fan look for specific musicians or specific venues to determine availability.

Figure 2A:
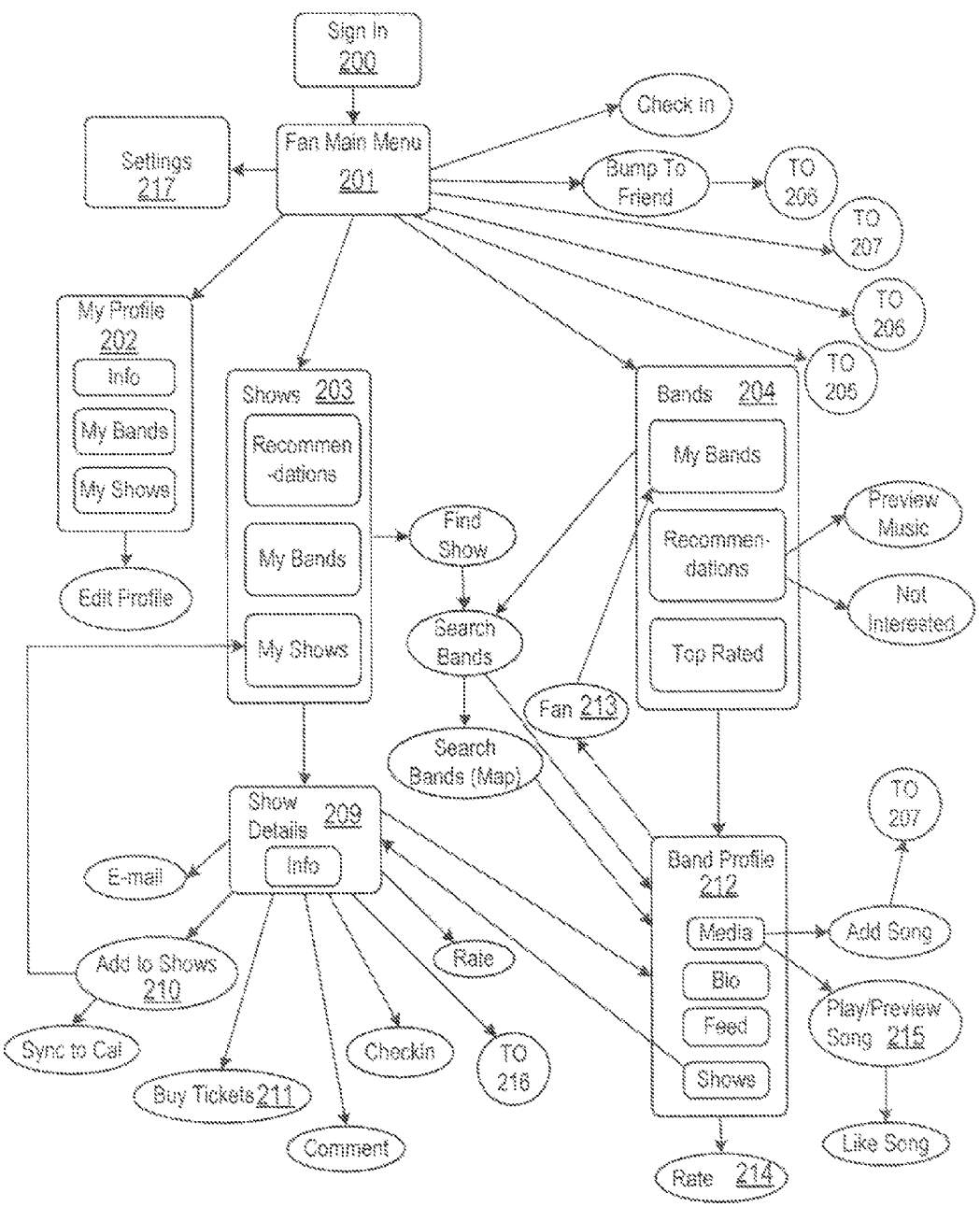

FIGS. 2A and 2B illustrates the interface options of a fan interacting with an embodiment of the system. The user logs in 200, enters the system via Fan interface 201 and from there can go to a plurality of interfaces for different functions, including, but not limited to, Profile 202, Shows 203, Bands 204, Venues 205, Friends 206, Songs 207, and News Feed 208.

Profile 202 allows the user to define parameters for interaction with the system so that the user can be provided the most useful information. The system allows the fan to create a profile which defines a geographic region, defines genres in which the fan is interested, allows the fan to identify musicians in whom the fan interested, and also allows the fan to fine tune options to maximize the fan's enjoyment. For example, the fan may be willing to travel distance X on weekday nights to see a performance and travel a larger distance Y on weekend nights to see a performance. Similarly, a fan may be willing to travel further to see musician A than musician B. The system also anticipates a fan's possible travel by allowing the fan to inform the system if the fan is presently, or plans to be, in a different geographical location.

Figure 7:
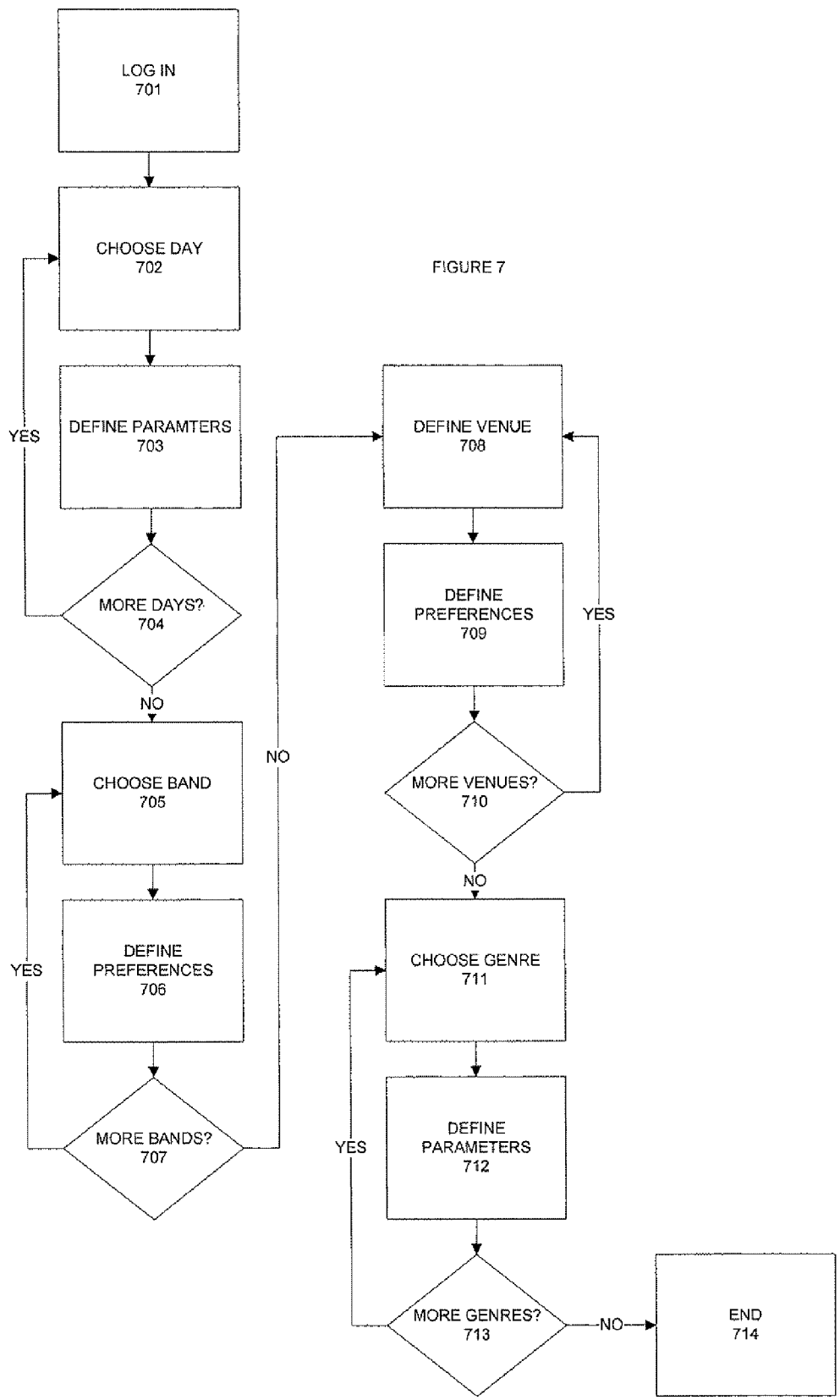
FIG. 7 is a flow diagram illustrating the creation of a user profile in the system.

FIG. 7 is a flow diagram of an embodiment of a user establishing settings using the system. At step 701 the user logs into the system. At step 702 the user chooses a day of the week for which to set preferences. At step 703 the user defines parameters for that day. For example, the user may define a maximum distance from home that the user is willing to travel on that day to see a show. The user may establish a smaller travel distance on a weeknight due to a more limited ability to have enough travel time due to work or other commitments. In addition, the user may want to define a show start time and/or end time to allow enough time to return home and get enough rest for a following work day. For weekend days, the user may want to define a larger travel area and a wider range of start/end times. At decision block 704, it is determined if there are more days for the user to define a profile. If so, the system returns to step 702, if not, the system proceeds to step 705.

At step 705 the user may choose a band in the system of interest to the user and for which the user may want to receive alerts whenever the band is performing and the performance is within the parameters of the user. At step 706 the user defines preferences for the band, including distance to show, start times, venues, alert preferences and the like. At decision block 707 it is determined if the user wants to define parameters for more bands. If so, the system returns to step 705. If not, the system proceeds to step 708.

At step 708 the user selects a venue. The system may have a list of participating venues that are within the largest distance defined by the user. The user can select a venue and then define parameters for that venue at step 709. These parameters can include amenities, such as parking, bathrooms, ratings by other users, start times, availability of seats, ticket prices, day of week and the like. The user can also define alerts for each venue to be notified whenever there is an event at the venue that matches the profile preferences, regardless of the band performing. At decision block 710 it is determined if the user wants to define parameters for more venues. If so, the system returns to step 708, if not, the system proceeds to step 711.

At step 711, the user selects a genre of music of interest. This allows the user to be able to receive alerts about new music of that genre at step 712 so that the user can have the opportunity to be exposed to new music when a band of that genre is performing. At decision block 713 it is determined if the user wants to define another genre. If so, the system returns to step 711. If not, the system ends at step 714.

Returning to FIGS. 2A and 2B, the Shows interface 203 allows the user to see what shows the user may have elected to attend, the Bands the user has elected to follow, and recommendations from the system for upcoming shows that may satisfy the user's profile and parameters. The user can elect to see Show details at screen 209 where the user can add the show to the user's list 210 or buy tickets 211 through the system. The system allows the user to send emails about the show, synchronize a show to the user's calendar, comment on the show, check in, comment and rate a show.

The Band interface 204 allows the user to get updates on the bands that the user has elected to follow, see recommendations from the system of other bands that may be of interest to the user, and also see the top rated bands on the system as determined pursuant to some metric. For example, it could be top rated bands based on the user's friends ratings, could be for all users of the system, or could be limited to the geographical region of the user, or any other metrics as desired.

The user may choose to look at a Band profile 212 that includes Media of the band, bio, shows, and in one embodiment a media feed. If it is a new band, the user may elect to become a Fan 213. For any band the user may rate the band 214, or play a song 215 from the band. The Band interface 204 also allows the user to search bands by name or by map as desired.

The Venues interface 205 shows a list of venues either elected by the user or within the defined parameters of the user. The list may be dynamically modified for day of the week and/or time of day. The user can search and add venues as desired and may elect to see venue detail 216. This allows the user to see information about the venue, to see comments from musicians, fans, and friends, as well as show schedule information at the venue. The show information can be comprehensive or filtered based on the preferences and parameters of the user. At this interface the system allows the user to check in to a venue if the user is attending a show at that venue and/or rate the venue.

The Friends interface 206 is a social media based interface that allows the user to define friends, find friends, and deal with friend requests and communications with friends. The user can also reach his Profile interface 202 from the Friend interface as desired.

The Songs interface can display songs that the user has downloaded via the system and, in one embodiment, can host all of the songs in a user's music library as desired. The system can also present a Song of the Day to the user. This may be a system wide selection, a geographical area selection, or a user specific selection based on the user profile. The user can select the Song of the Day to play or any other song available to the user, using the built in player 217. The user can download a song as desired. The download may be free or fee based depending on the circumstances.

In one embodiment, the system includes a News Feed 208 that provides aggregated information about the user's Friends, Bands, Events, and other information as desired. Finally, the system includes a Settings interface 217 where the user may elect certain options for the general look and feel of the system.

Finding an Event

The system is a push-pull system. The fan can request information (pull) by logging in to the preference engine 504 and requesting information about a specific night, venue, or musician. The system can list all performances over some upcoming time period and rank the performances based on the fan's preferences and options.

Figure 4:
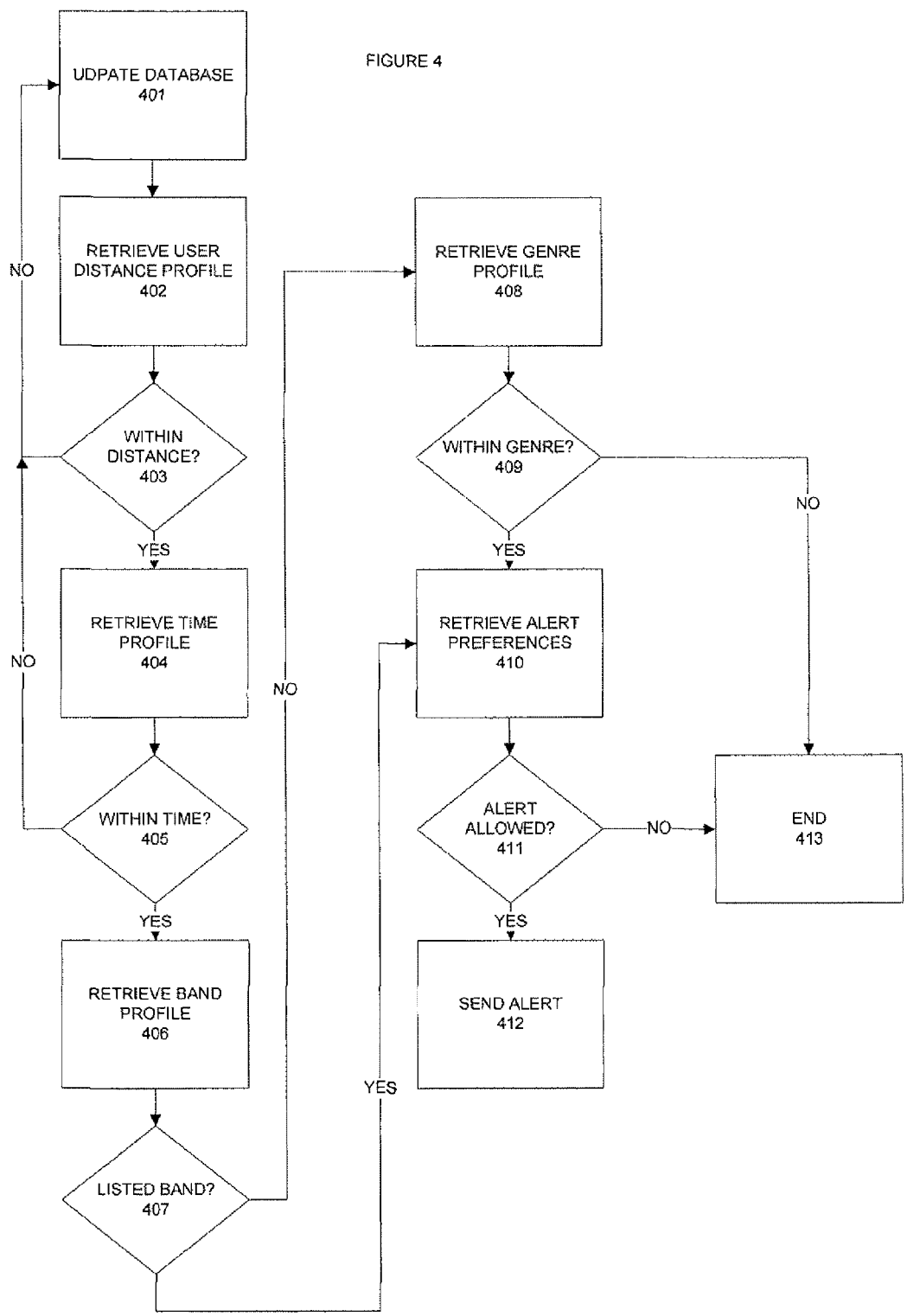
FIG. 4 is a flow diagram of an embodiment of a push alert in the system.

Alternatively, the system can automatically send (push) information to the fan based on preferences and options defined by the fan. Because the system incorporates a rating system of the venues and the musicians, a fan can specify a minimum rating for a musician and/or venue and have only those musician/venues be presented. FIG. 4 is a flow diagram of an embodiment of the system in sending alerts to a user about a show. At step 401 the system updates its database of upcoming shows. At decision block 402 the system retrieves a user's distance profile. At decision block 403, for each show, it is determined if the location of the show is within the distance preference of the user. If not, the system returns to step 401. If so, the system proceeds to step 404 and retrieves the user's time profile.

At decision block 405 it is determined if the show is within the user's time range (start time and/or end time). If not, the system returns to step 401. If so, the system proceeds to step 406 and retrieves the user's band profile.

At decision block 407 it is determined if the show is for a band in which the user has indicated a preference. If not the system proceeds to step 408 and retrieves the genre profile of the band. At decision block 409 it is determined if the band is within the genre preference of the user. If not, the system ends at step 413.

If the genre is within the user preference, or if the band is a listed band at decision block 407, the system retrieves the alert preferences at step 410. At decision block 411 it is determined if the user has permitted the type of alert (or any alert) associated with the show. If so, the system sends the user an alert at step 412. If not, the system ends at step 413.

The preference engine 504 can be accessed via computer or smart-phone as desired. The preference engine in one embodiment provides a browser driven interface for access by all participants over a suitable network (e.g. internet, wifi, 3G, 4G, WAP, and the like). The system allows interaction between participants as well as between additional users who have permitted such relationships (e.g. friends).

The system allows the fan to search for events by venue, by musician, by show, by friends, and the like. Whenever the fan reaches a musician profile on the system, at least one song of the musician is available for download. In one embodiment, at least one song is downloadable or listenable for free. In other embodiments, additional songs may be downloaded for a price. In the case of other types of performers, the download could be of any suitable type and is not limited to songs.

The system does not only recommend performances, but also can recommend songs for download based on fan preferences and options. In addition, the fan is free to browse specific venues or musicians as desired.

One useful feature in an embodiment of the system is the real-time listing of attendees for an upcoming performance. This is accomplished via location tracking via smart-phones, by opt-in registration by users, or via some other manner of determining the presence of participants at a performance. This can create a sense of urgency for the fan to make a reservation for the performance as soon as possible. In another embodiment, the system can send alerts to the fan when favourite musicians or venues are close to selling out so that the fan can make a reservation without missing out on a sold-out performance. The system in one embodiment identifies the number of attendees who are members of the system. In another embodiment, the system may identify the user names of actual attendees. This embodiment will show the names of attendees with whom the user has an online relationship (i.e. friends) and when permissions to reveal information to other friends have been given. This embodiment can create additional interest in an event when the user sees that other friends have signed up. An advantage of the system is the accurate statistics that can be generated and made available to participants of the system. Instead of being estimates, the data represents actual statistics that make it more meaningful than other systems.

Ratings

An advantage of the system is the ratings available for events, venues, and musicians. Users can rate providers, providers can rate coordinators, and coordinators can rate providers. All of these ratings add to the value of the system in serving preferences.

System members can rate a musician on a number of factors, including recorded performances and live performances. The system can filter ratings for a musician for a specific venue, or for specific time periods, or for other options. The system can also filter ratings for venues for specific musicians, for specific time periods or days of the week, or for more general reviews. The system can also recall only the fan's ratings if desired, so that the fan can rely on their own taste in making decisions. The system can also filter ratings by the friends of a fan only, by all users, by fans in a geographic region, or by fans who have actually checked in at events and venues that they have rated.

Fan Show Check-in

A feature of the system is where the fan checks-in at the show (typically using a device such as a smart-phone). This allows the musician, venue owner, and/or promoter to know specifically who is attending and to reward attendees with recognition (such as on message boards, shout-outs from the musician/emcee, and the like), reward points for attending performances, and material benefits such as digital coupons for free or discounted merchandise, opportunity to download a recording of that night's performance, and the like.

Fan Reward

The system also contemplates loyalty and reward systems for fans. A fan can gain points by participating on the site, attending events, checking into events, purchasing songs, rating musicians and venues, and the like. The number of points can unlock additional features of the system, entitle the fan to discounts or complimentary music, shows, merchandise, and the like.

A fan can become system friends with other fans, with musicians, with venues, and/or with venue operators. This allows the fan to filter and fine tune information from the system to keep the fan informed of events and performances in the fans areas and regions of interest.

Musician Interface

The band interface in the system provides a number of useful features and allows the band a number of B2B capabilities. Initially, a musician must be accepted into the system. There is a screening process that is implemented in one embodiment of the system before a provider (e.g. musician) is accepted. This screening process may comprise a source of industry professionals, including college DJ's and the like. When a musician applies and submits at least one song for downloading, the referral sources are contacted for any information they have about the musician. In one embodiment, the referral sources will play the song and look for feedback from their audiences. If the feedback is sufficient, the referral source will contact the system and the musician will be admitted to the system. The goal is to have a minimum standard of professionalism and acceptance for all musicians that are part of the system. If the musician has played events at member venues, the musician identifies those venues and the operators of those venues may be polled about the musician.

Once accepted into the system, the musician can generate a profile page that includes venue and attendance information, genre, location, and the like. The musician can include other information that may be available to fans who select the bands profile page or who follow the band in the system.

Figure 3A:
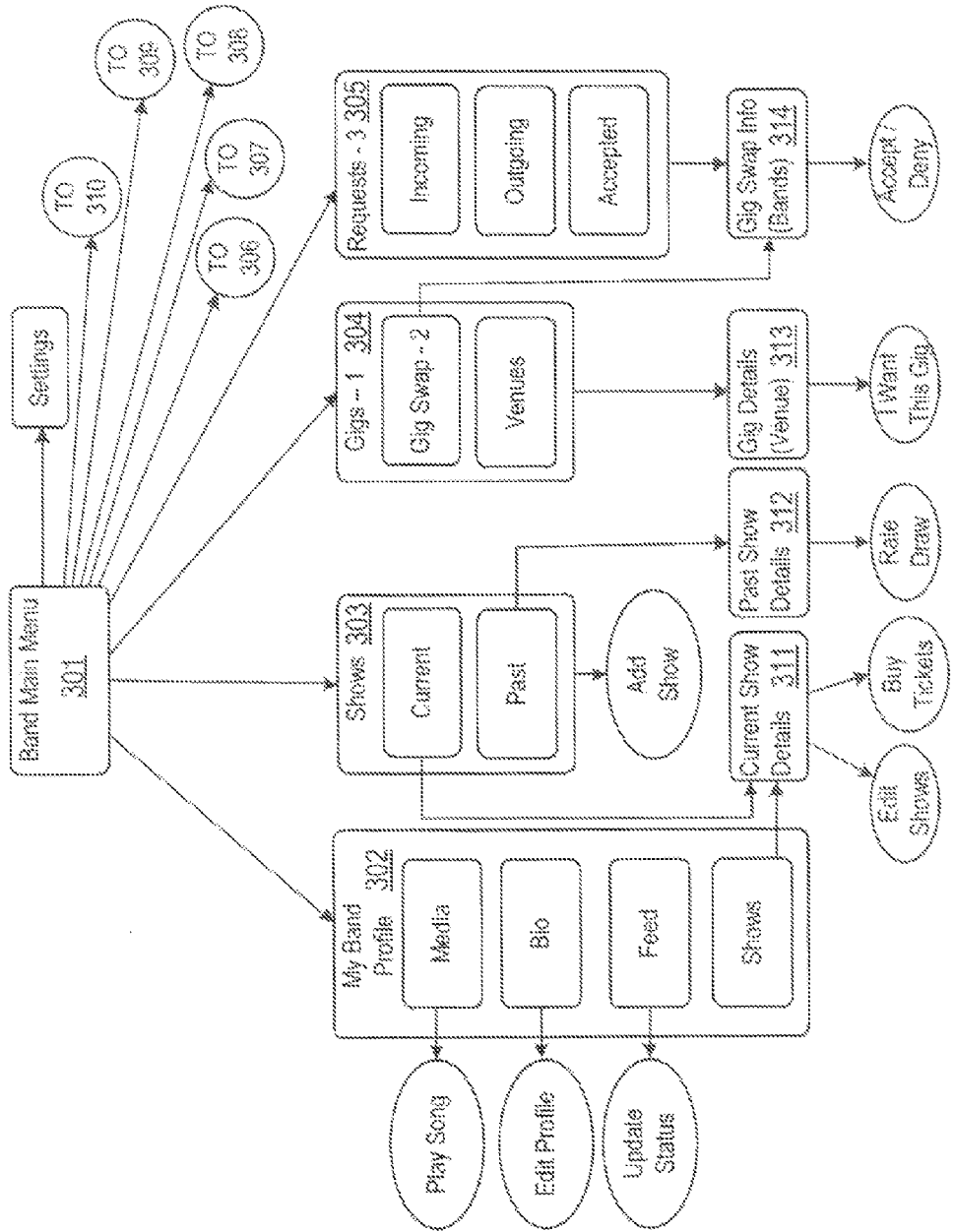
FIGS. 3A and 3B illustrates an embodiment of a musician interface.
Figure 3B:
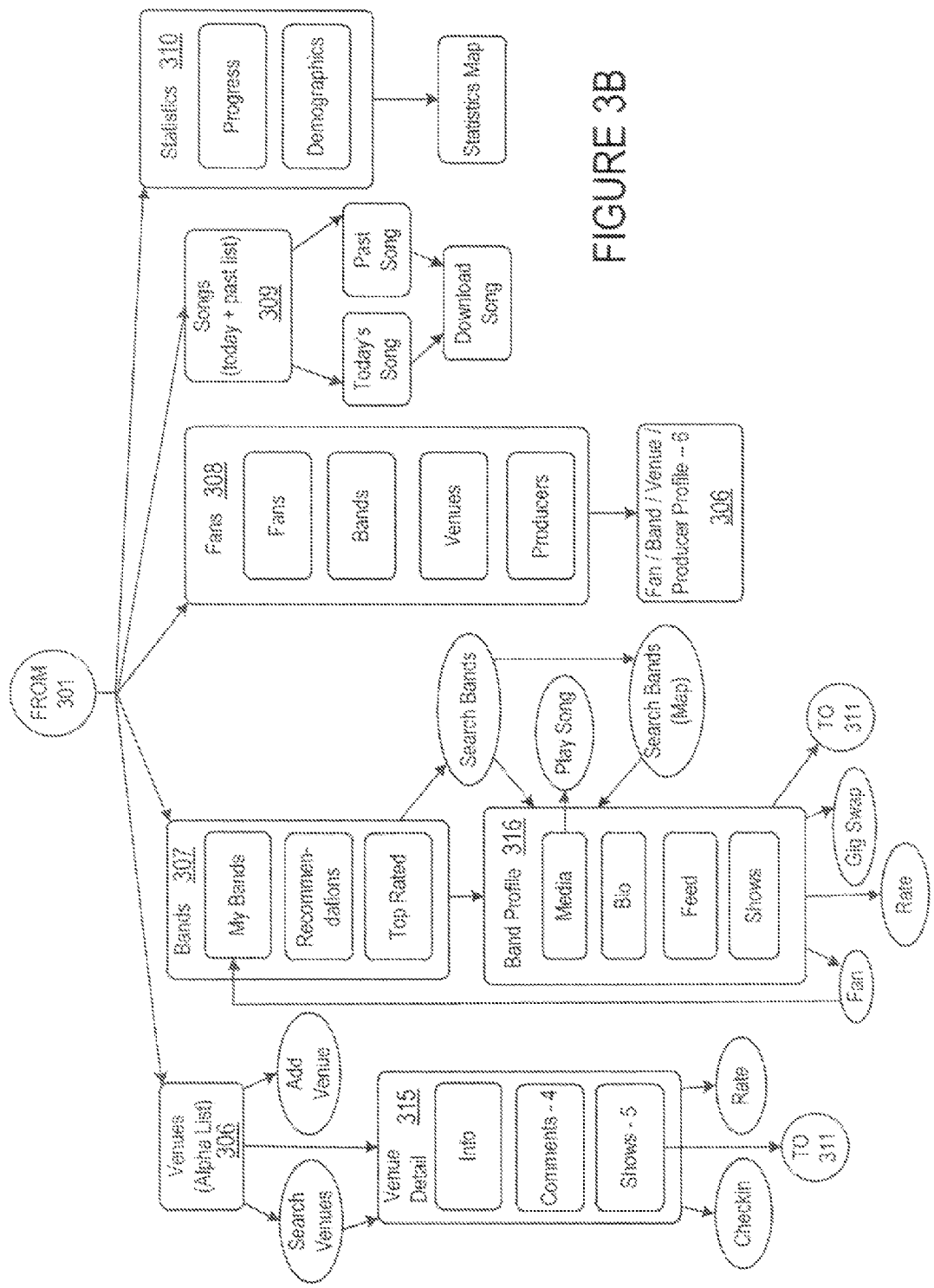

FIGS. 3A and 3B are an illustration of an embodiment of a Band interface 301. From the entry interface the user can go to a plurality of other interfaces, including, but not limited to, Band Profile 302, Shows 303, Gigs 304, Requests 305, Venues 306, bands 307, Fans 308, Songs 309, and Statistics 310.

The Band Profile 302 allows the band to provide information about the band that will allow fans and venues to find the band when searching for certain kinds of performers. The profile can include genre of music, bios of the band and members, show information and media feeds.

The Shows interface 303 presents the current show lineup of the band so that the band can see what dates may or may not be open. Past shows are also available for review by the band. The user may elect to see the current show details 311 or past show details 312. If desired, the band may want to include a set list or other information about the show as a performance aid or for fan enjoyment.

The Gig interface 304 is different from the Show interface 303. The Gig interface is designed to aid the band in finding gigs. The band may offer to swap gigs with another band. This can be done to fill an open night, to resolve a scheduling conflict, or for some other reason. The Gig swap info interface 314 can provide the details of the gigs involved in the swap. The Gig interface also identifies venues with gigs available and the band can see the gig details 313 and determine whether to make an offer to accept the gig. The gig details can include date, time, price, compensation details and the like. The band can accept a gig or accept/deny a gig swap in the Gig interface 304. In one embodiment of the system, the musician and venue can connect via the system to schedule a performance at the venue. This can be initiated by either the musician or the venue operator and allows an efficient model for booking events. Criteria for such a relationship can be established by the venue in one embodiment of the system. This may be via a page on the system set up by the venue itself.

A venue may make its calendar available and a musician may notice empty dates. The musician may contact the venue and request a booking for one or more open dates. The venue operator has access to ratings for the musician from fans and from other venue operators as well (including reliability, showmanship, attendance, food and beverage sales, crowd behaviour, and the like). Alternatively, a venue operator with an open date can use the system to search for musicians in a geographical area. The musicians also maintain a calendar of event dates and available dates that can be accessed by the system and the venue operators, By specifying a musician in a certain geographical region with a certain minimum rating and availability on a particular date, the system can identify possible musicians for an open event date at a venue.

The venue operator and musician can communicate with each other via the system and come to terms using tools provided by the system. The tools include contracts that can be finalized by the parties involved so that all activity in booking a musician or venue can be accomplished using the system.

The Requests interface 305 is used to track incoming, outgoing, and accepted requests, such as gigs, gig-swaps, and the like.

The Venues interface 305 allows the band to review a list of venues in which the band might be interested. The band can review venue details 315 such as general information, shows at the venue, comments and ratings about the venue, from fans and/or other bands. The band can also check-in at the venue if performing or rate the venue as desired. A musician can rate venues and venue operators on such things a cleanliness, promotion, size, payment timeliness and commitment to agreed upon deal terms, and the like. A musician will have access both the fans ratings of venues as well as ratings by other musicians who have rated a venue and/or venue operator. The musician can also access attendance figures for venues filtered as desired by the musician.

The Bands interface 307 allows a band to choose other bands to follow as desired. This interface works similarly to the same interface that a fan might use.

The Fans interface 308 allows the band to see a list of its fans, bands that it follows, venues, and producers. The Songs interface 309 allows the band to select songs that the band may make available for public consumption, either free or for pay, as desired. The statistics interface 310 allows the band to learn about the demographics of its fans. This allows the band to perhaps play more shows in a geographical region where they have more fans, or to identify underserved areas that might make good locations for shows.

The musician can inform any fans that have friended the musician of their performance schedule. In one embodiment, each fan can set filters for musicians, venues, ticket prices, time of show, day of week, and the like so that only events of interest are pushed to the fan from the musician. In other instances, a fan can access the musicians profile page and find all performance information as desired. In other embodiments, the fan can pull information by setting up search filters and receiving the search results.

The system allows fans to purchase tickets to the performance using the system. Depending on the response, additional shows may be added. In other instances, promotional efforts may be boosted or curtailed depending on fan response.

Venue Interface

The system allows venue and venue operators to register and access the system. A venue can be Mended by fans so that the venue can inform fans of events and performances at the venue. The system provides ticket purchasing capability for events at a venue so that the fan can do everything related to the enjoyment of music at a single location. The venue interface allows venues to rate musicians on a number of factors, including professionalism, showmanship, ticket sales, reliability, ancillary sales, crowd behaviour, and the like. A venue can access ratings of musicians from other venues and be forewarned about problem acts. The venue interface allows a venue to post available gigs and limit them by genre, payment amount, length of performance, and the like and make such gigs available to musicians that are part of the system. This allows musicians to find and obtain engagements without the need to canvass all venues for available dates. Depending on response, the venue may need to modify gig parameters. In some cases, the gig may be for a part of a bill with other musicians who may have already been booked.

As noted above, the system provides an interface for contracts that allow a venue to complete contracts with acts via the system, truly providing a one stop shop for B2B activities between musicians and venues.

Industry Interface

The system also provides an industry interface for licensing of music for commercials, movies, television shows, games, bumpers, and the like. A musician can identify music available for licensing and provide metadata about the music so that industry professionals can search by genre, type, speed, and other metadata factors. The system allow for system based licensing contracts that may be automated as desired. In some cases, the musician will require direct dealings and in other cases, the licensing may be automatic at a specified rate depending on use.

Distribution and Sales

The system also includes mechanisms for music sales by musicians. The system allows the sale of songs or tracks by the musicians to fans. The fan can create an account and charge downloads to the account as desired.

Other Embodiments

Although described above in connection with music, the system has equal application to other environments as well. For example, the system could be used with actors, playhouses, and fans. It could apply to any type of performer who uses a venue put on an event for consumers, including, but not limited to, comedians, artists, dancers, and the like.

The system may also be used in other commercial contexts such as real estate, new and used car purchase, vendor hiring, medical treatment, adult entertainment, location filming, roommate finders, and the like. In real estate, the user (buyer) uses the system to identify properties and sellers (providers) and may use brokers (coordinators) to facilitate the transaction. The system allows for greater fine tuning of preferences than in current systems, allowing more specific geographic bounding of property searches, allowing sellers to see buyers and prices they are willing to pay that otherwise might have been missed.

In another embodiment, the system can be adapted for use as a specialized "yellow pages" for a city to use to inform and promote local businesses and city services. Because the system provides a preference engine that can have specific and limited geographic restraints, the system can be constrained to a city block or even to a single address in a city or town. This would allow residents to be informed of city and/or commercial services that are specific to their address, instead of for the entire city or community.

In one embodiment, a user may select a band that is not already a member of the system. This may be via a search by a user or by a band being listed at a venue show roster. When this occurs, the system does not have a band page to provide. In lieu of the band page, the system will retrieve an ad for display based on parameters of the user and the system. For example, the system may serve the ad based on the geographical region of the user. Alternatively, the system may serve an ad based on other metrics from the user profile. If there are multiple ads that satisfy the requirements, the system may serve them in a round-robin rotation or randomly or based on some other metric for serving ads.

Embodiment of Computer Execution Environment (Hardware)

Figure 8:
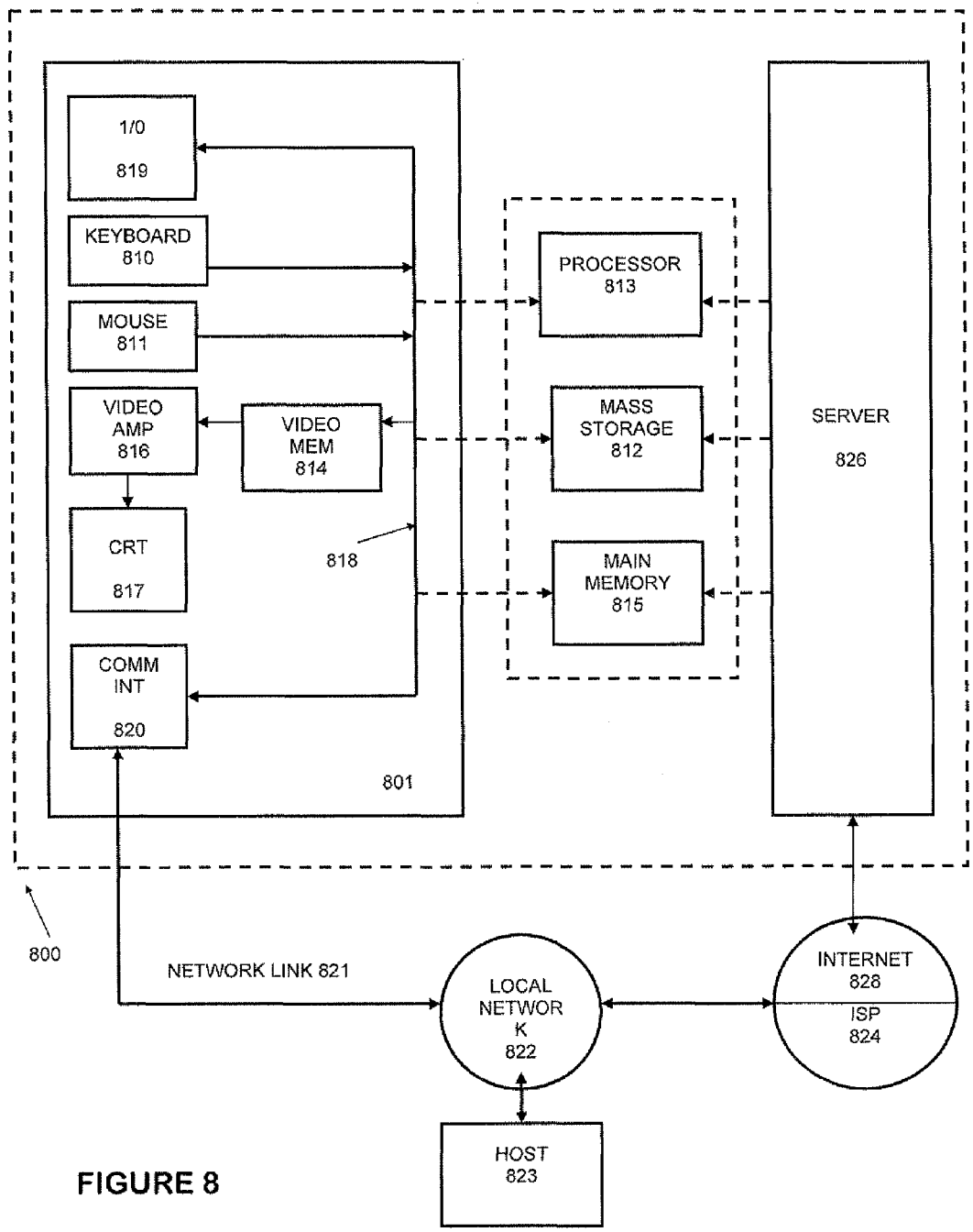
FIG. 8 is an example processing environment of an embodiment of the system.

An embodiment of the system can be implemented as computer software in the form of computer readable program code executed in a general purpose computing environment such as environment 800 illustrated in FIG. 8, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 810 and mouse 811 are coupled to a system bus 818. The keyboard and mouse are for introducing user input to the computer system and communicating that user input to central processing unit (CPU 813. Other suitable input devices may be used in addition to or in place of, the mouse 811 and keyboard 810. I/O (input/output) unit 819 coupled to bi-directional system bus 818 represents such I/O elements as a printer, A/V (audio/video) I/O, etc.

Computer 801 may be a laptop, desktop, tablet, smartphone, or other processing device and may include a communication interface 820 coupled to bus 818. Communication interface 820 provides a two-way data communication coupling via a network link 821 to a local network 822. For example, if communication interface 820 is an integrated services digital network (ISDN) card or a modem, communication interface 820 provides a data communication connection to the corresponding type of telephone line, which comprises part of network link 821. If communication interface 820 is a local area network (LAN) card, communication interface 820 provides a data communication connection via network link 821 to a compatible LAN. Wireless links are also possible. In any such implementation, communication interface 820 sends and receives electrical, electromagnetic or optical signals which carry digital data streams representing various types of information.

Network link 821 typically provides data communication through one or more networks to other data devices. For example, network link 821 may provide a connection through local network 822 to local server computer 823 or to data equipment operated by ISP 824. ISP 824 in turn provides data communication services through the world wide packet data communication network now commonly referred to as the "Internet" 828 Local network 822 and Internet 828 both use electrical, electromagnetic or optical signals which carry digital data streams. The signals through the various networks and the signals on network link 821 and through communication interface 820, which carry the digital data to and from computer 800, are exemplary forms of carrier waves transporting the information.

Processor 813 may reside wholly on client computer 801 or wholly on server 826 or processor 813 may have its computational power distributed between computer 801 and server 826. Server 826 symbolically is represented in FIG. 8 as one unit, but server 826 can also be distributed between multiple "tiers". In one embodiment, server 826 comprises a middle and back tier where application logic executes in the middle tier and persistent data is obtained in the back tier. In the case where processor 813 resides wholly on server 826, the results of the computations performed by processor 813 are transmitted to computer 801 via Internet 828, Internet Service Provider (ISP) 824, local network 822 and communication interface 820. In this way, computer 801 is able to display the results of the computation to a user in the form of output.

Computer 801 includes a video memory 814, main memory 815 and mass storage 812, all coupled to bi-directional system bus 818 along with keyboard 810, mouse 811 and processor 813.

As with processor 813, in various computing environments, main memory 815 and mass storage 812, can reside wholly on server 826 or computer 801, or they may be distributed between the two. Examples of systems where processor 813, main memory 815, and mass storage 812 are distributed between computer 801 and server 826 include thin-client computing architectures and other personal digital assistants, Internet ready cellular phones and other Internet computing devices, and in platform independent computing environments, The mass storage 812 may include both fixed and removable media, such as magnetic, optical or magnetic optical storage systems or any other available mass storage technology. The mass storage may be implemented as a RAID array or any other suitable storage means. Bus 818 may contain, for example, thirty-two address lines for addressing video memory 814 or main memory 815. The system bus 818 also includes, for example, a 32-bit data bus for transferring data between and among the components, such as processor 813, main memory 815, video memory 814 and mass storage 812. Alternatively, multiplex data/address lines may be used instead of separate data and address lines.

In one embodiment of the invention, the processor 813 is a microprocessor such as manufactured by Intel, AMD, Sun, etc. However, any other suitable microprocessor or microcomputer may be utilized, including a cloud computing solution. Main memory 815 is comprised of dynamic random access memory (DRAM). Video memory 814 is a dual-ported video random access memory. One port of the video memory 814 is coupled to video amplifier 819. The video amplifier 819 is used to drive the cathode ray tube (CRT) raster monitor 817. Video amplifier 819 is well known in the art and may be implemented by any suitable apparatus. This circuitry converts pixel data stored in video memory 814 to a raster signal suitable for use by monitor 817. Monitor 817 is a type of monitor suitable for displaying graphic images.

Computer 801 can send messages and receive data, including program code, through the network(s), network link 821, and communication interface 820. In the Internet example, remote server computer 826 might transmit a requested code for an application program through Internet 828, ISP 824, local network 822 and communication interface 820. The received code maybe executed by processor 813 as it is received, and/or stored in mass storage 812, or other non-volatile storage for later execution. The storage may be local or cloud storage. In this manner, computer 800 may obtain application code in the form of a carrier wave. Alternatively, remote server computer 826 may execute applications using processor 813, and utilize mass storage 812, and/or video memory 815. The results of the execution at server 826 are then transmitted through Internet 828, ISP 824, local network 822 and communication interface 820. In this example, computer 801 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. In other embodiments, the system may be implemented on any suitable computing environment including personal computing devices, smart-phones, pad computers, and the like. An embodiment of the invention may be implemented in any type of computer system or programming or processing environment.

What is claimed is:

1. A method for providing information to a user comprising:
   receiving, in a preference engine operated by a server, preferences from the user input on one or more computing devices to create a preference profile, the preferences including at least one of geographic region, distance from venue, time range, venues of interest, bands of interest, genres of interest, and allowing the user's geographic location to be tracked;
   receiving, by the server, musical event information from musicians input on one or more computing devices;
   receiving, by the server, musical venue information from venue operators input on one or more computing devices;
   after receiving the musical event information and musical venue information, collecting metrics, by the server, from the musical event information and the musical venue information;
   after receiving preferences from the user and collecting metric, comparing, by the server, the metrics to the preference profile of the user;
   alerting, by the server, the user when the metrics of a live music event satisfy the preferences of the user; and
   alerting, by the server, the user when the number of tickets available for the live music event has fallen below a predetermined threshold.

2. The method of claim 1 wherein the metrics include date, time, price, and location information.

3. The method of claim 2 wherein the preference profile includes temporal boundaries on an event.

4. The method of claim 3, wherein the user can input different temporal boundaries for different dates or days of the week.

5. The method of claim 2 wherein the preference profile includes geographic boundaries on an event.

6. The method of claim 5, wherein the user can input different geographic boundaries for different dates or days of the week.

7. The method of claim 2 wherein the preference profile includes price boundaries on an event.

8. The method of claim 2 wherein the preference profile includes provider boundaries on an event.

9. The method of claim 1, wherein the preferences include ratings of musicians.

10. The method of claim 1, wherein the preference profile allows the user to select a push mechanism or a pull mechanism for alerts, and wherein all alerting is provided using the selected mechanism.

11. A method for providing information to a user comprising:
    receiving, in a preference engine operated by a server, preferences input on one or more computing devices by the user to create a preference profile, the preferences including venue information and at least one of time period, musicians of interest, and genres of interest;
    receiving musical event information input on one or more computing devices by musicians, the musical event information comprising available dates for booking;

after receiving musical event information, collecting metrics, by the server, from the musical event information;

after collecting metrics, comparing the metrics, by the server, to the preference profile of the user;

alerting, by the server, the user when the metrics of musicians satisfy the preferences of the user;

establishing a live music event at the venue with the musicians; and receiving information, by the server, from computing devices operated by attendees as they arrive at the live music event and providing at least some of the information to a computing device operated by the user.

12. The method of claim 11, further comprising providing the user with a real-time listing of the attendees.

13. The method of claim 11, further comprising sending coupons or rewards to attendees after they arrive at the live music event.

14. A method for providing information to a user comprising:

receiving, in a preference engine operated by a server, preferences input on one or more computing devices by the user to create a preference profile, the preferences including at least one of venue information, geographic region, and genre;

receiving venue information, by the server, from one or more computing devices operated by a venue operator, the venue information comprising available dates for booking;

after receiving venue information, collecting metrics by the server, from the venue information;

after collecting metrics, comparing the metrics, by the server, to the preference profile of the user;

alerting, by the server, the user when the metrics satisfy the preferences of the user;

establishing, by the server, a live music event at the venue with the user;

receiving fan information, by the server from one or more computing devices operated by fans of the user, the fan information comprising demographic information and information identifying the user; and providing, by the server to one or more computing devices operated by the user, demographic information of the fans.

15. The method of claim 14, wherein the information identifying the user comprises ratings of the user.

16. The method of claim 14, wherein the demographic information comprises geographic information of the fans.

17. The method of claim 14, wherein the demographic information comprises age information of the fans.

* * * * *